UNITED STATES PATENT OFFICE.

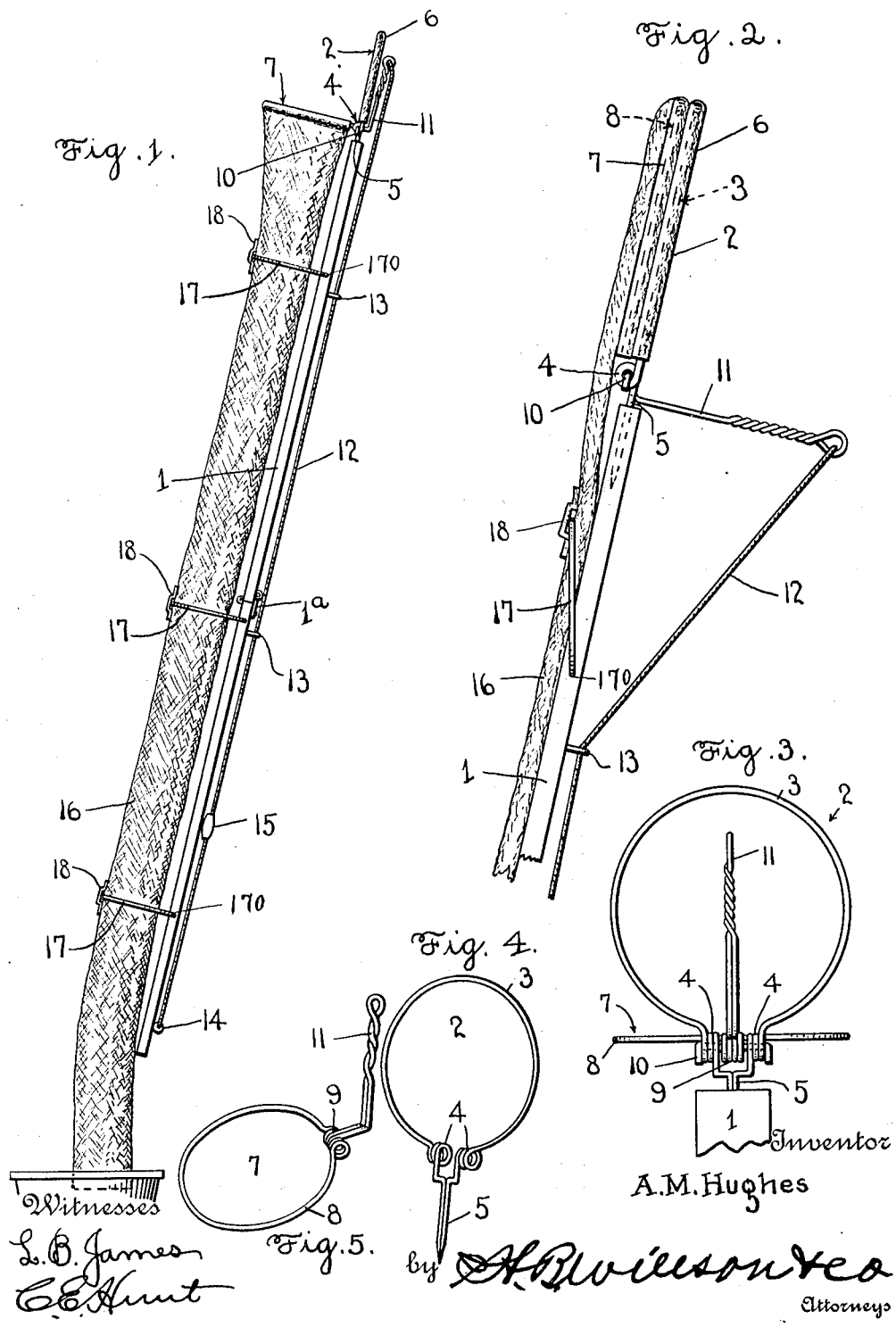

ALBERT M. HUGHES, OF SEDALIA, MISSOURI, ASSIGNOR OF ONE-HALF TO WILLIAM W. BARRETT, OF SEDALIA, MISSOURI.

FRUIT-PICKER.

1,040,947.  Specification of Letters Patent.  Patented Oct. 8, 1912.

Application filed November 16, 1911. Serial No. 660,644.

*To all whom it may concern:*

Be it known that I, ALBERT M. HUGHES, a citizen of the United States, residing at Sedalia, in the county of Pettis and State of Missouri, have invented certain new and useful Improvements in Fruit-Pickers; and I do declare the following to be a full, clear, and exact description of the invention, such as will enable others skilled in the art to which it appertains to make and use the same.

This invention relates to improvements in fruit pickers.

One object of the invention is to provide a fruit picker having an improved construction and arrangement of picking mechanism and means, whereby the fruit when picked is conducted to a suitable receptacle without being bruised or injured.

Another object is to provide a fruit picker which will be simple, strong and durable in construction, efficient in operation and which may be employed for picking all kinds of large or small fruit.

With these and other objects in view the invention consists of certain novel features of construction, and the combination and arrangement of parts as will be more fully described and claimed.

In the accompanying drawings; Figure 1 is a side view of my improved fruit picker showing the jaws in open position; Fig. 2 is a similar view of the upper end of the picker showing the jaws in closed position; Fig. 3 is a rear elevation of the upper portion of the picker, with the tube removed, looking from the right in Fig. 1. Fig. 4 is a detail perspective view of the stationary jaw member; and, Fig. 5 is a similar view of the movable jaw member of the picker.

In the embodiment of the invention I provide a supporting pole 1 which may be of any desired length and which is preferably formed in two or more sections which are hingedly connected together whereby the pole may be folded to occupy a comparatively small space when not in use. Hooks 1ª or other suitable fastening devices are connected to the hinged ends of the sections whereby the latter may be rigidly fastened when the pole is in an extended position. On the outer end of the pole is secured a stationary jaw member 2 which is preferably constructed from a single wire rod bent to form a substantially circular frame 3. The ends of the frame are bent into the form of spring coils 4 which form one member of a hinge connection for a movable jaw hereinafter described. After forming the coils 4 the ends of the rod are bent inwardly to form attaching shanks 5 which are driven or otherwise firmly secured in the outer end of the pole 1 as shown. The frame 3 of the jaw member 2 is provided with a flexible cover 6 which is preferably formed of canvas or similar fabric.

Pivotally connected to the stationary jaw 2 is a movable jaw member 7 also preferably constructed of a single wire rod bent to form a substantially circular frame 8 corresponding in size to the frame 3 of the stationary jaw with which said movable jaw co-acts. The ends of the rod forming the frame 8 are bent into spring coils 9 which form the other member of the hinge connection between the stationary and movable jaw members and into said coils 9 and the coils 4 of the stationary member is inserted a pivot pin or pintle 10 the ends of which are bent to form stops which hold the pin in position for connecting the members of the hinge together. The ends of the wire rod after forming the eyes 9 are twisted together and bent at substantially right angles to the frame 8 of the movable jaw and form an operating lever 11 by means of which said movable jaw is adapted to be swung up into closed position wherein the same co-acts with the stationary jaw for removing the fruit from the trees. The coils 4 and 9, render the members 2 and 7 elastic, so that when fruit is accidentally grasped between the jaws, the pressure on the fruit will be yielding, and the fruit will not be bruised.

Connected to the end of the lever 11 is a jaw operating cord 12 which passes through guide eyes 13 on the pole 1 and is connected at its lower end to an eye or suitable fastening device 14 as shown. Secured to the cord 12 near its lower end is sleeve 15 by means of which the cord may be firmly grasped for operating the movable jaw member.

To the frame 8 of the movable jaw member is connected the upper open end of a flexible fruit conducting tube 16 which is preferably formed of canvas or similar fabric and which extends a considerable distance beyond the lower end of the rod 1. The tube 16 is held in position alongside the pole 1 by a series of rings 17 through which the tube passes, said rings being pivotally connected to the pole in any suitable manner, as, for instance, by inserting their ends in holes 170 in the opposite sides of the pole, as shown. These rings embrace the tube and are attached to the outer side thereof by suitable straps, as at 18. When the tube is drawn up, as the movable jaw is raised to the position of Fig. 2, the outer edges of the rings 17 are carried up, as shown, thus pressing the rings against the pole and closing the tube whereby the fruit picked by this action will be retarded in its passage through the tube, and delivered, without bruising, into the receptacle at the end of the tube. When using the picker the lower end of the tube is preferably placed in a basket or other receptacle so that the fruit falling through the lower end of the tube may be readily discharged from said lower end of the tube into the receptacle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. In a fruit picker, a pole, an elastic fixed jaw comprising a frame of wire having its ends bent to form spaced apart alined spring coils and thence continued in parallel and adjacent lines into the end of the pole, a movable jaw member comprising a frame having its ends formed into adjacent coils mounted between and in alinement with those of the elastic fixed jaw and thence twisted to form an operating lever, and a pintle arranged in the spring coils of both jaws.

2. A fruit picker comprising a supporting pole, a stationary jaw member secured to the outer end thereof, a movable jaw member hingedly connected to said stationary jaw member, an operating cord connected with said movable jaw member whereby the latter is closed into engagement with the stationary jaw member, a flexible fruit conducting tube connected at its upper end to said movable jaw and extending alongside of and below the lower end of the pole, a ring loosely pivoted to the pole and embracing the connecting tube, and means whereby the ring is loosely secured to the outside of the tube in a manner to cause the ring to move on its pivot when the tube is raised and lowered with the movable jaw.

In testimony whereof I have hereunto set my hand in presence of two subscribing witnesses.

ALBERT M. HUGHES.

Witnesses:
GEO. S. HENDERSON,
ANNA DIEFENDORF.

Copies of this patent may be obtained for five cents each, by addressing the "Commissioner of Patents, Washington, D. C."